Dec. 26, 1967 B. H. TONGUE 3,360,731

BALANCED-TO-UNBALANCED IMPEDANCE MATCHING TRANSFORMER CIRCUIT INCORPORATING LUMPED REACTANCE OF ITS BINDING POSTS

Filed Dec. 3, 1963

INVENTOR.
BEN H. TONGUE

BY Rines and Rines

ATTORNEYS

United States Patent Office 3,360,731
Patented Dec. 26, 1967

3,360,731

BALANCED-TO-UNBALANCED IMPEDANCE MATCHING TRANSFORMER CIRCUIT INCORPORATING LUMPED REACTANCE OF ITS BINDING POSTS

Ben H. Tongue, 41 Ferris Drive,
West Orange, N.J. 07052

Filed Dec. 3, 1963, Ser. No. 327,678
5 Claims. (Cl. 325—386)

ABSTRACT OF THE DISCLOSURE

This application involves a novel balanced-to-unbalanced impedance transformer employing two-wire balun conductors of length small compared to the quarter wavelengths of the high frequencies with which it is to be employed and incorporating the lumped reactance of its binding post terminals, rendering it adaptable for minimal size construction and wide-band operation.

Figure 1:
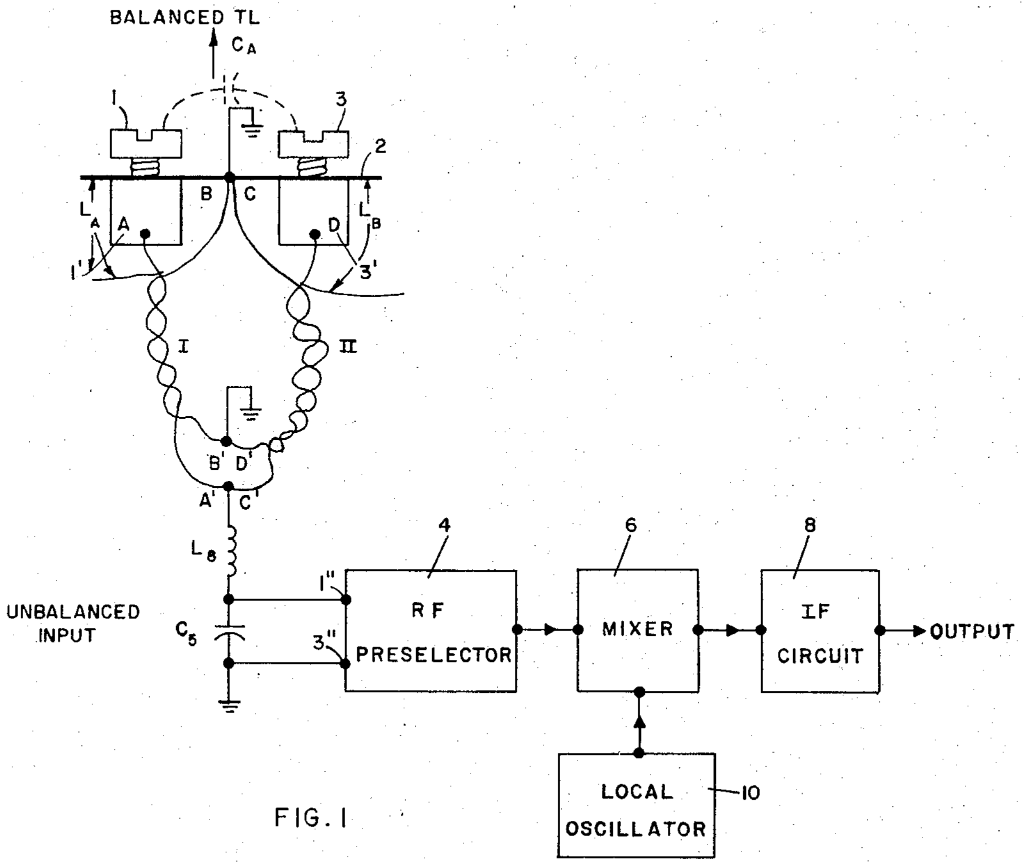

The present invention relates to balanced-to-unbalanced impedance transformers and, more particularly to such devices adaptable for use in the ultra-high-frequency range and above, as in converters of the neutralized amplifier type described in my prior United States Letters Patent No. 2,778,934, issued Jan. 22, 1957.

Balanced-to-unbalanced impedance transformers or "baluns" have been constructed in a variety of forms. In the television field, for example, it has been customary to employ so-called elevator coils of electrical length substantially a quarter of the wavelength at the mid-frequency of the band, for enabling a 300-ohm line to match a 75-ohm input circuit. Such devices, however, are subject to the disadvantages that they are relatively large in size and they are rather frequency sensitive in operation. When connected to screw-type terminals or binding posts and the like, moreover, having substantial distributed capacitance, the balanced-to-unbalanced transformation is often upset, and the effect of the terminals must be tuned out by supplementary reactances and similar devices.

Other types of prior-art impedance transformers of this character employ high inductance tightly coupled autotransformers, as discussed, for example, in my prior United States Letters Patent No. 2,815,406, issued Dec. 3, 1957, for wide band distribution amplifier system; but such devices, because of limitations in the iron associated with the autotransformer, are not suited to very high-frequency operation such as the ultra-high-frequency range and above.

Still another prior approach to such impedance transformation has involved coupling to tuned circuits which are inherently balanced; but such techniques are highly critical in operation and are not adaptable for single-ended tuned circuits. When unbalanced tuned circuits are used, however, coupling of a balanced pickup loop to a suitable portion of the electro-magnetic circuit has been effective for impedance transformation. Several types of variable-condenser UHF tuners, for example, employ this technique, since a suitable field region is readily available near one of the tuning inductors of such equipment for enabling such coupling. Where, however, there is no such availability, such a simple solution is not useful.

It is accordingly to the solution of the problem of providing a universally usable suitable balanced-to-unbalanced impedance transformer that is not subject to a single one of the above disadvantages or limitations, but that, to the contrary, is available for use in the ultra-high-frequency field, is of very small size and is not upset by the capacitance of terminal binding posts and the like, that the present invention is primarily directed.

A further object of the present invention is to provide a novel balun of this character that shall be of extremely low cost, as is required in mass-produced low-cost converters and similar equipment.

Still another object is to provide a novel impedance transformer of more general utility, also.

Other and further objects will be explained hereinafter and will be more particularly pointed out in connection with the appended claims.

Figure 2:
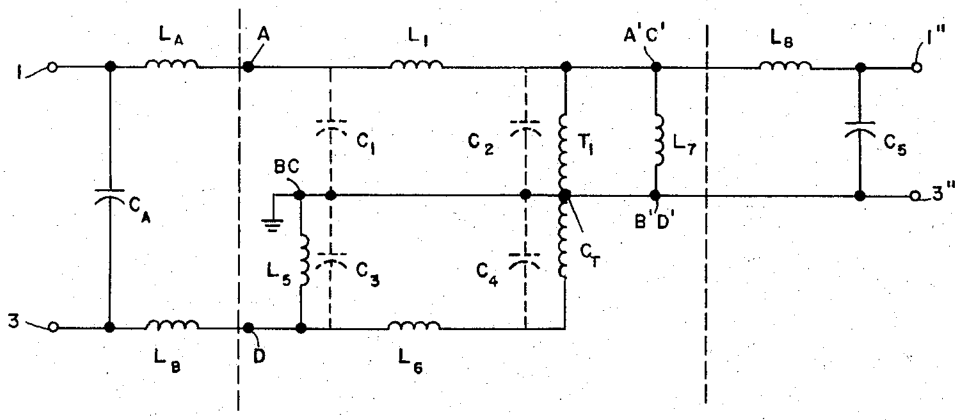

The invention will now be described in connection with the accompanying drawing, FIG. 1 of which is a diagrammatic view of a transformer constructed in accordance with a preferred embodiment of the invention, illustrated as applied to a converter system; and FIG. 2 is a schematic circuit diagram representing the equivalent circuit of the transformer structure of FIG. 1.

Referring to FIG. 1, two sets of low-impedance conductor pairs I and II, the insulated wires of which are preferably twisted together both for purposes of mechanical rigidity and an electrical function later explained, are shown connected to binding post terminals A and D. In accordance with the present invention, the length of the conductors I and II, between points A–A′, B–B′ of the twisted pair I, and between points C–C′, D–D′ of the twisted pair II, is made very small compared with the quarter-wavelengths of the frequencies with which the device is to be used (say, of the order of about one-tenth the wavelength, more or less), in order that the wires may act as lumped elements and not as transmission line elements, as has been customary in the before-mentioned prior-art baluns and elevator coil circuits. Through this expedient, the effective capacitance $C_A$ between the screw terminals A and D as well as the effective series inductance $L_A$ and $L_B$ thereof serve as lumped elements that may be readily tuned with the lumped elements represented by the twisted wire pairs I, II, to prevent reflection of energy over the band of interest. Adjacent wire ends of each twisted pair I and II are connected to the terminals at A and D and to a common grounded chassis terminal B–C. Inverted connections obtain at the other wire ends, ends B′ and D′ being grounded and ends A′ and C′ being connected together.

If, for example, the terminals A and D are to be connected by respective screw connectors 1 and 3 to a balanced transmission line TL, such as a 300-ohm parallel-wire antenna input, the transformer I, II is intended to permit, with suitable matching (i.e., little reflection of energy), the application of the antenna-received radio-frequency energy to the unbalanced input 1″, 3″ of, for example, a 75-ohm radio-frequency input stage 4, connected as described in my said Letters Patent No. 2,778,934 to a converter system comprising a mixer 6 that develops a converted intermediate frequency at 8 in the response to appropriate local oscillations from the oscillator 10. The capacitance $C_A$ and the terminal inductances $L_A$ and $L_B$ are, of course, determined by the size and spacing of these elements in the apparatus. In accordance with the invention, one then selects an appropriate length of wire pairs I and II (that is, from A to A′ and B to B′, and from C to C′ and D to D′), considering the insulation thickness and thus the electrical spacing between the twisted wires, and supplements the same with a further series inductance $L_8$ connected to the common terminals A′–C′, and capacitance $C_5$ to ground. The term "ground" as herein employed is intended to embrace not only actual earthing but chassis or other reference potential, as well. These lumped elements are then tuned such that they act as a substantially constant impedance filter covering the frequency range of interest, as, for example, the before-mentioned UHF band of from about 470 to 890 megacycles, and thus providing a satisfactory balanced-to-unbalanced line transition.

Referring to FIG. 2, the equivalent circuit of this novel construction is presented. The series inductances $L_A$ and $L_B$ and the capacitance $C_A$ of the terminals are illustrated to the far left, and the wire-pair ends A, B, C, D, A′, B′, C′, D′, are shown at the appropriate points of the equivalent circuit. Succinctly stated, the series inductance $L_1$ of FIG. 2 represents the equivalent inductance of the twisted paid A–A′, B–B′. Capacitances $C_1$ and $C_2$, shown shunted to the grounded terminal, represent the capacitances corresponding to the spacing between the twisted wires effected by the insulation before-mentioned. The other twisted pair II (C–C′ and D–D′) produces phase inversion as a result of the previously described inverted connections whereby, although end C is grounded and end D is ungrounded, opposite end C′ is ungrounded and end D′ is grounded. This pair II may be represented by an equivalent circuit comprising an ideal transformer $T_1$ centrally grounded at CT and connected between $L_1$ and a series inductance $L_6$. Inductance $L_6$ connects to the terminal D and to further inductance $L_5$ that, in turn, is connected between the terminal D and the ground terminal BC. Inductance $L_7$ is connected between the center point CT of the ideal transformer $T_1$ and terminal A′–C′, CT being, also, the common terminal B′–D′. The shunt capacitance of the twisted wires II is represented by capacitors $C_3$ and $C_4$. The inductance $L_8$ and capacitance $C_5$ that are tuned with this circuit for the results before described are shown to the far right in FIG. 2.

The following description may aid in explaining the operational details. Assuming, for purposes of explanation, inductance between points A and B–C, corresponding to $L_5$ of FIG. 2, and substantially equal capacitances $C_1$ and $C_3$ and $C_2$ and $C_4$, and substantially equal inductances $L_A$ and $L_B$, it will be observed that the circuits to the left of $T_1$ between the center tap CT and the upper and lower terminals of $T_1$, are symmetrical. Considering, then, the upper single-ended circuit portion alone, it comprises a one-section low-pass filter ($C_A$, $L_A$ and part of $C_1$), a double-tuned high-impedance-inductive coupled circuit (the said assumed inductance between A and BC, part of $C_1$, $L_1$, part of $C_2$ and $L_7$), and an output low-pass filter section (remainder of $C_2$, $L_8$ and $C_5$). The cut-off frequency of the two low-pass filter sections is adjusted appreciably above the high end of the band of interest and the cutoffs of the double-tuned circuit are adjusted well below and well above the limits of the band of interest to enable a good impedance match over the band to appear at the 1, 3 when the output terminals 1″, 3″ are terminated in the characteristic impedance. The effect of not using the assumed inductance between A and BC somewhat unbalances the transformer (decreases balance-to-unbalanced ratio at the low end of the band), but this has not proved detrimental in practice.

In a successful practical circuit operable in the before-mentioned ultra-high-frequency band, the length of the twisted wires A–A′, B–B′, C–C′, D–D′ was each about three-quarters of an inch, with about five twists. The capacitance $C_A$ was of the order of three-quarters of a micro-microfarad, and the elements $L_8$ and $C_5$ were respectively about 0.008 microhenry and 1.5 micro-microfarads, with the system tuned to about 630 megacycles, intermediate the band. This transformer, in addition to its low cost features, provided a most satisfactory reflection coefficient of less than 0.2 and an insertion loss of less than one-half a decibel over the complete ultra-high-frequency band. So far as is known, no such performance has ever been attained with the aid of such simplified construction, in this high frequency range.

Further modifications will occur to those skilled in the art and all such are considered to fall within the spirit and scope of the invention as defined in the appended claims.

What is claimed is:

1. In a converter for ultra-high-frequencies, a balanced-to-unbalanced impedance transformer having, in combination, two sets of insulated twisted two-wire conductors of length small compared to the quarter-wavelengths of the said ultra-high-frequencies, a pair of terminals adapted for connection to a balanced circuit and respectively connected to one end of one wire of each set, means for connecting the adjacent end of the other wire of each set to ground, means for connecting the end opposite the said one end of one wire of one set to ground together with the end opposite the grounded end of the said other wire of the other set, means for connecting together the remaining opposite ends of the wires of the sets and to a series inductance and capacitance connected to ground, means for connecting an unbalanced circuit to the said capacitance, the said inductance and capacitance being tuned with the said sets of twisted wires and the inherent lumped reactance of the said pair of terminals to provide substantially constant filter response to the said ultra-high-frequencies.

2. Apparatus as claimed in claim 1 and in which the said balanced circuit comprises a balanced transmission line for receiving the ultra-high-frequencies, and the said unbalanced circuit comprises mixer means cooperative with local oscillator means for producing a converted intermediate frequency from the ultra-high-frequencies.

3. Apparatus as claimed in claim 1 and in which the said tuning is effected at a wavelength intermediate the band of ultra-high-frequencies, the said length is of the order of a tenth of the said wavelength, the said inductance is of the order of 0.008 microhenry and the said capacitance is of the order of 1.5 micro-microfarads.

4. Apparatus as claimed in claim 3 and in which the sets are twisted the order of five times.

5. In a high-frequency band system, a balanced-to-unbalanced impedance transformer having, in combination, two sets of insulated twisted two-wire conductors of length small compared to the quarter-wavelengths of the said band, a pair of terminals adapted for connection to a balanced circuit and respectively connected to one end of one wire of each set, means for connecting the adjacent end of the other wire of each set to ground, means for connecting the end opposite the said one end of one wire of one set to ground together with the end opposite the grounded end of the said other wire of the other set, means for connecting together the remaining opposite ends of the wires of the sets and to a series inductance and capacitance connected to ground, means for connecting an unbalanced circuit to the said capacitance, the said inductance and capacitance being tuned with the said sets of twisted wires and the inherent lumped reactance of the said paid of terminals to provide substantially constant filter response to the said band.

References Cited

UNITED STATES PATENTS

| | | | |
|---|---|---|---|
| 2,026,308 | 12/1933 | Ganz | 333—25 |
| 2,165,086 | 11/1936 | Alford | 333—25 |

OTHER REFERENCES

Talkin and Cuneo, Wide Band Balun Transformer, The Review of Scientific Instruments, vol. 28, No. 10, October 1957.

KATHLEEN H. CLAFFY, *Primary Examiner.*

A. H. GESS, *Assistant Examiner.*